Nov. 12, 1940.　　　J. H. MURCH　　　2,220,943
ADHESIVE APPLYING MACHINE
Filed Dec. 8, 1938　　　2 Sheets-Sheet 1

INVENTOR.
John H. Murch
BY Evan A. Thornburgh
Charles H. Cline
ATTORNEYS

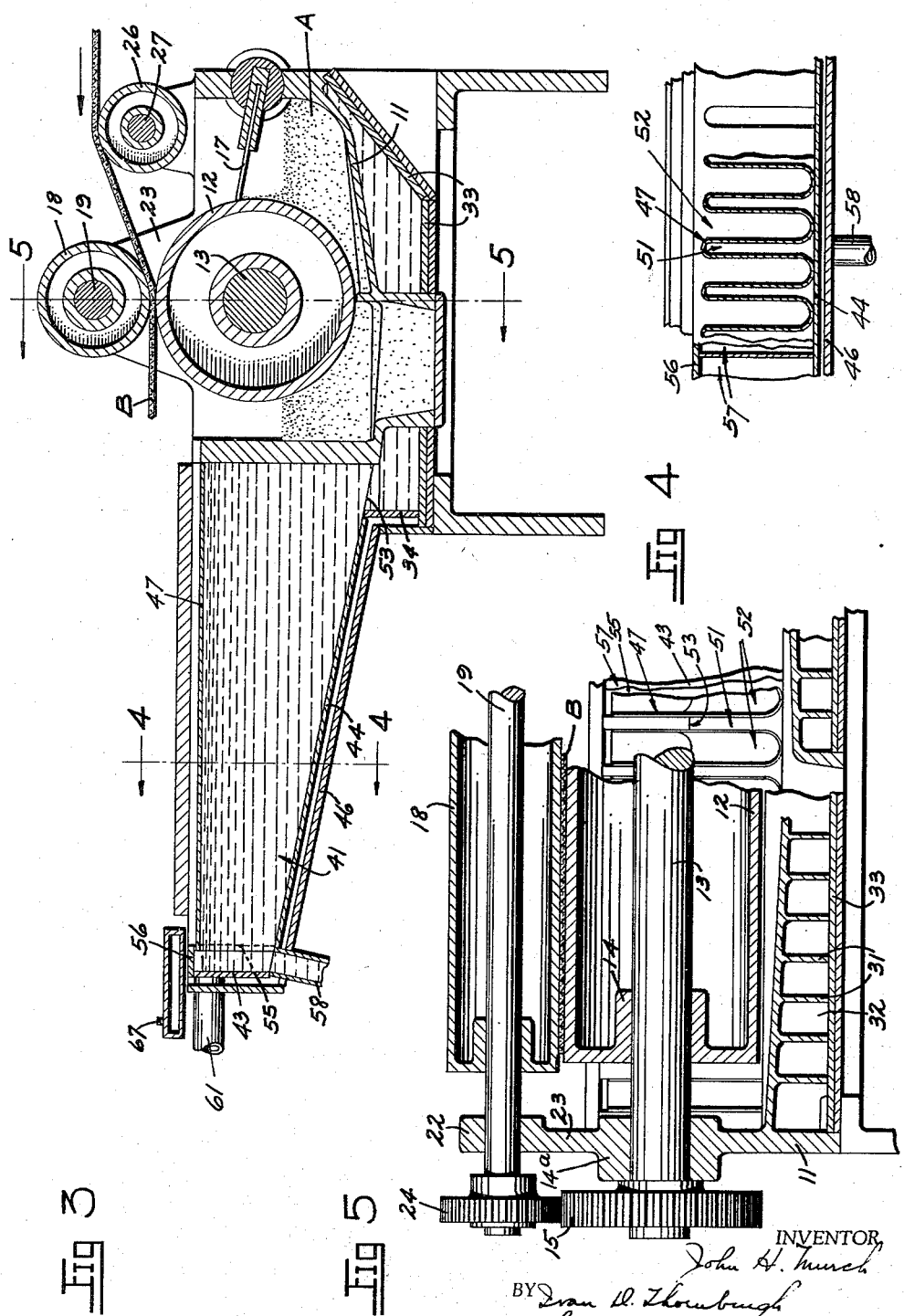

Patented Nov. 12, 1940

2,220,943

UNITED STATES PATENT OFFICE 2,220,943

ADHESIVE APPLYING MACHINE

John H. Murch, East Orange, N. J., assignor to American Can Company, New York, N. Y., a corporation of New Jersey Application December 8, 1938, Serial No. 244,685

5 Claims. (Cl. 91—46)

The present invention relates to adhesive applying machines using a thermoplastic adhesive and has particular reference to a pre-melting pot in which the adhesive is introduced in a solid, finely divided form for melting into fluid form ready to use.

An object of the invention is the provision of an adhesive applying machine wherein adhesive in a finely divided solid form may be melted down into fluid form ready for use in a minimum of time.

Another object is the provision in such a machine of a pre-melting pot having a grid form sloping bottom for receiving and for quickly melting the finely divided solid adhesive particles.

Another object is the provision in a machine of this character of devices for feeding the finely divided adhesive in a continuous flow uniformly spread across the pre-melting pot so that all sections of the pot receive equal amounts of adhesive thereby insuring uniform melting of the adhesive in a minimum of time.

Numerous other objects and advantages of the invention will be apparent as it is better understood from the following description, which, taken in connection with the accompanying drawings, discloses a preferred embodiment thereof.

Referring to the drawings.

Figures 1, 2:
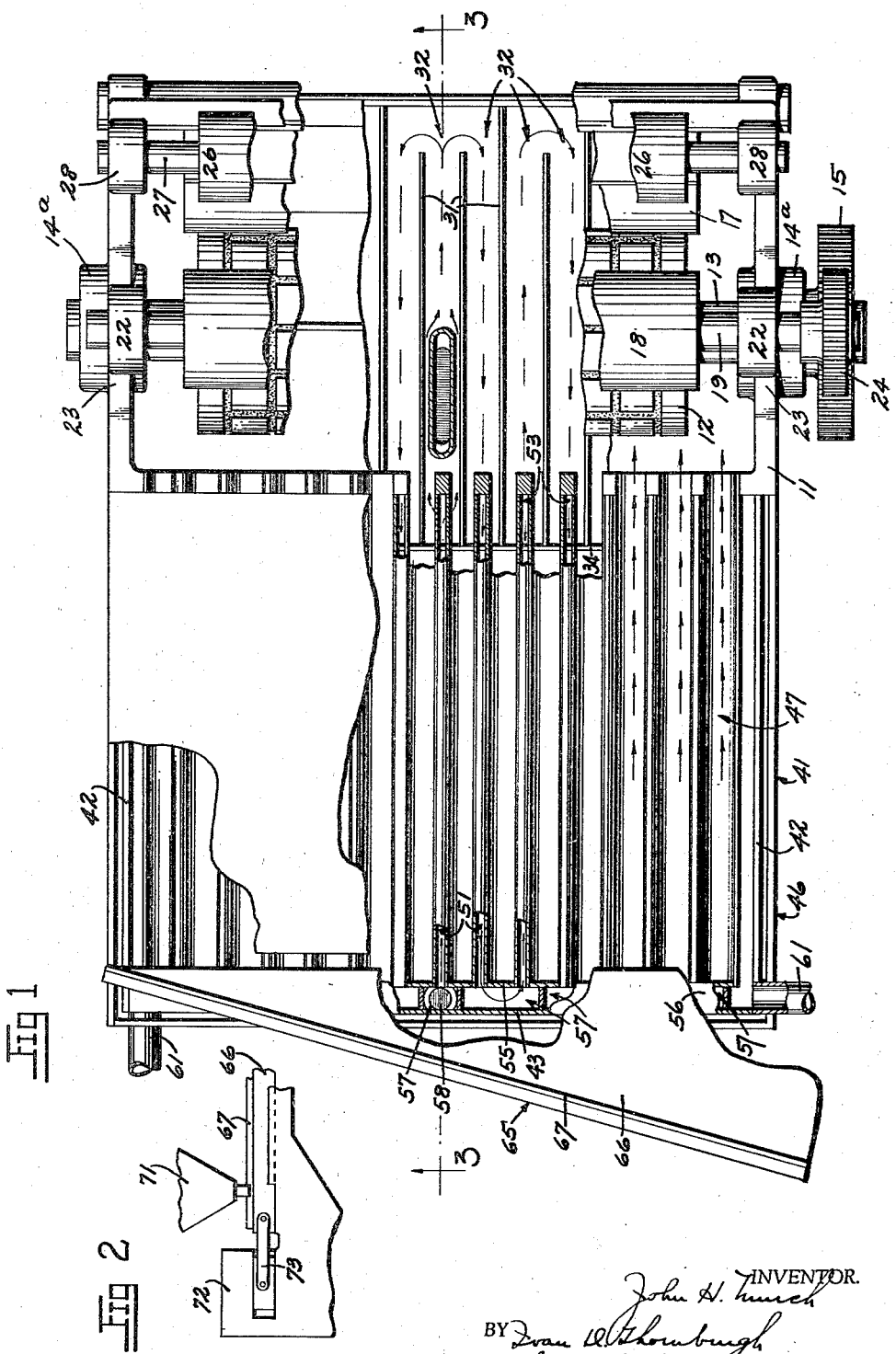
Figure 1 is a top plan view of an adhesive applying machine embodying the instant invention, parts being broken away.
Fig. 2 is an elevational detail of a portion of the machine shown in Fig. 1.

Fig. 3 is a longitudinal section taken substantially along the line 3—3 in Fig. 1, with parts broken away; and Figs. 4 and 5 are fragmentary detail sections taken substantially along the respective lines 4—4 and 5—5 in Fig. 3.

As a preferred embodiment of the invention the drawings illustrate a machine for melting and applying a thermoplastic adhesive A (Fig. 3) onto a web of sheet material B in a desired design while the adhesive is still liquid. In this machine the fluid adhesive A is contained in a tank 11. The adhesive is applied to the web of sheet material B by an intaglio roller 12 having bearing portions 14 mounted on a shaft 13 in turn journaled in bearings 14a (Figs. 1 and 5) formed in the tank. The intaglio roller is rotated in the adhesive by any suitable means, such as for example, a gear 15 which is mounted on the outer end of the roller shaft. A doctor 17 bearing on the outer surface of the intaglio roller scrapes off the excess adhesive.

The web of sheet material is held against the surface of the intaglio roller by a pressure roller 18 at which time it receives the adhesive impression. This pressure roller is above the intaglio roller and is mounted on a shaft 19 carried in bearings 22 formed in brackets 23 extended up from the tank 11.

The pressure roller is rotated at a speed which insures its lineal surface to correspond with that of the intaglio roller. This is effected by a gear 24 which meshes with the intaglio roller driving gear 15. An idler roller 26 is mounted adjacent the pressure roller on a shaft 27 carried in bearings 28 formed on the tank. The idler roller supports the web of sheet material for passage between the pressure roller and the intaglio roller.

The adhesive A while in the tank 11 is maintained in a fluid condition by a heating medium such as hot oil, hot water, steam or the like which is circulated below and in contact with the walls of the tank. For this purpose the bottom of the tank is formed with a plurality of depending vertical dividing webs 31 (Figs. 1 and 5) which set off between them longitudinal channels 32. The bottoms of these channels are closed off by plates 33. At the forward end of the tank, i. e., at the left as viewed in Figs. 1 and 3 the ends of the channels are closed off by a vertical plate 34.

At the opposite or rear end of the tank the middle two webs 31 terminate short of the rear wall of the tank thus providing communication between the middle channel 32 and the adjacent channel on each side thereof (see Fig. 1). The next web 31 on each side of the two middle short webs extends all the way back to the rear wall thus closing off the channel at that position. The adjacent webs alternate in short and long webs as shown so that communication is provided between the alternate and opposite ends of the channels as will now be explained.

The heating medium for the tank 11 also serves an adhesive pre-melting pot 41 which is preferably formed as an extension of the forward end of the tank 11. This pre-melting pot includes an open top container which is preferably rectangular in cross section, having parallel side walls 42, an outer end wall 43, and a sloping bottom wall 44. The inner end wall is the plate 34 of the tank. The entire sides and bottom of the melting pot are enclosed in a casing 46 which is spaced away from the walls of the pot thereby providing for the circulation of air therearound.

Inside the pre-melting pot 41 there is disposed a grid 47 (see also Fig. 4) having a sinuous shape in cross-section thereby setting off alternate narrow longitudinal passageways 51 which are closed at the top and open at the bottom, and parallel wide grooves or troughs 52 which are open at the top and closed at the bottom. At the tank end of the melting pot the troughs communicate with the tank 11. The narrow passageways terminate at the tank wall but communicate at their bottoms by way of openings 53, with the channels 32 disposed under the tank. Hence the heating medium can pass from channels into the passageways and from passageways into channels.

At the outer end of the melting pot the troughs 52 terminate at a plate 55 which is spaced inwardly of outer wall 43 of the pot. The narrow passageways also terminate at this plate but are in communication with the space between the plate and the outer wall 43 of the pot. This space is closed at the top by a cover 56 and is also divided off into compartments 57. Each compartment takes in two passageways 51 with the exception of the middle compartment which takes in only the middle passageway as shown in Fig. 1. This middle compartment is also in communication with a pipe 58 which constitutes the inlet pipe for the heating medium. The pipe leads to any suitable source of supply of the heating medium.

Hence the heating medium entering the middle compartment 57 by way of the inlet pipe 58 flows into the middle passageway 51, passing down through the grid of the pre-melting pot along a path of travel indicated by the arrows and empties out through the middle opening 53 into the middle channel 32 of the tank 11. After passing through this channel the heating medium spreads sidewise in both directions into the adjacent channels 32, flowing back through the tank, the openings 53, the passageways 51 into the communicating compartments 57 adjacent the middle compartment.

From here it returns through the next adjacent communicating passageway 51 back through the pre-melting pot and the tank in two (one on each side of the middle of the machine) sinuous paths of travel which wind back and forth heating the troughs 52 of the pre-melting element and the interior of the tank as it travels. At the end of its path of travel through the machine the heating medium passing on each side enters an outlet pipe 61 which is threaded into the pot. There are thus two of these outlet pipes 61, one on each side of the machine at the end of the path of travel of the heating medium therethrough. In other words there is one point of entrance for the heating medium which dividing may be returned to its source for recirculation or may lead to any other suitable place of deposit.

While the pre-melting pot 41 is heated by the circulating heating medium, finely divided adhesive in solid form may be introduced into the pot to maintain a supply of fluid adhesive in the tank 11. This added supply is to off-set the amount taken out on the web B.

The solid adhesive is preferably introduced directly into the troughs 52 of the pot and hence immediately contacts the heated walls of the troughs. This melts the adhesive and brings it into fluid form. The fluid adhesive thereupon flows down the sloping bottoms of the troughs and into the tank 11.

This melting is gradual there being a mixture of the fluid and solid adhesive in various intermediate stages in the troughs. By the time the adhesive mass reaches the tank, however, it is all fluid. Solid adhesive ordinarily takes a long time to melt but with this construction of pre-melting pot, permitting the use of finely divided particles, it has been considerably reduced, only a minimum time being required.

In order to further speed up the melting action and to obtain a more uniform melt the finely divided solid adhesive is sprinkled into the troughs 52 of the melting pot preferably at a uniform speed and in uniform quantities. For this purpose the machine is shown associated with an adhesive feeding device 65 which includes a flat feeding platform 66 having a triangular shape such as shown in Fig. 1.

This feeding platform is disposed at the outer forward end of the machine over the top of the troughs 52. The machine edge of the feeding platform is open. The outer edge is provided with a guide rail 67 (see also Figs. 2 and 3). The platform is tubular in cross section and is preferably cooled in any suitable manner such as by circulating a cooling medium or the like therethrough. This prevents the adhesive from becoming permaturely heated and from sticking to the platform.

The solid adhesive is dropped onto this platform from a hopper 71 (Fig. 2) or the like and the platform is vibrated back and forth by any suitable means such as a vibrator device 72 which may be connected by a link 73 to the platform. Such a device for accomplishing this vibrating action is disclosed in United States Patent 1,772,596, issued August 12, 1930, to John A. Taylor, on Electric reciprocating motor, and United States Patent 1,779,454, issued October 28, 1930, also to John A. Taylor, on Vibrating apparatus.

As the platform 66 vibrates the grains of solid adhesive dropped thereon travel along in a step by step movement, crowding against the guide rail 67. This vibrating movement together with the guide rail spreads the adhesive out over the platform in a thin sheet, the grains at the inner edge of the platform falling off into the troughs 52 at a uniform rate of flow and in a continuous stream of uniform proportions.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A pre-melting pot for thermoplastic adhesive and the like, comprising in combination a container having a bottom wall and a sinuous grid in said container engaging said bottom wall, said grid setting off passageways open at their opposite ends only for the circulation of a heating medium successively therethrough over said bottom wall and also setting off alternate troughs for the reception of a solid adhesive in a finely divided form, said troughs being closed at one end and open at the other end so that solid adhesive introduced therein adjacent their closed ends is converted into fluid form by the heating medium thereupon flowing out through their open ends to a suitable place of deposit.

2. A pre-melting pot for thermoplastic adhesive and the like, comprising in combination, a container having a bottom wall and a grid having a corrugated cross section in said container supported by and engaging said bottom wall, said grid setting off sloping passageways open at their opposite ends only for the circulation of a heating medium successively therethrough over said bottom wall and also setting off alternate sloping troughs for the reception of a solid adhesive in a finely divided form, said troughs being closed at one end and open at the other end so that solid adhesive introduced therein adjacent their closed ends is converted into fluid form, by the heating medium, thereupon flowing out through their open ends to a suitable place of deposit.

3. A pre-melting pot for thermoplastic adhesive and the like, comprising in combination a container having a bottom wall and a grid in said container engaging said bottom wall, said grid setting off passageways open at their opposite ends only for the circulation of a heating medium successively therethrough and also setting off alternate troughs for the reception of a solid adhesive in a finely divided form, said troughs being closed at one end and open at the other end so that solid adhesive introduced therein adjacent their closed ends is converted into fluid form, by the heating medium, thereupon flowing out through their open ends to a suitable place of deposit, and adhesive feeding devices disposed adjacent one end of said container for gradually feeding the solid adhesive into said troughs in uniform quantities and at a continuous uniform rate of speed.

4. A pre-melting pot for thermoplastic adhesive and the like, comprising in combination a container having a bottom wall and a grid in said container engaging said bottom wall, said grid setting off spaced passageways open at their opposite ends only for the circulation of a heating medium progressively therethrough and also setting off alternate troughs for the reception of a solid adhesive in a finely divided form, said troughs being closed at one end and open at the other end so that solid adhesive introduced therein adjacent their closed ends is converted into fluid form, by the heating medium, thereupon flowing out through their open ends to a suitable place of deposit, an adhesive feeding platform disposed adjacent one end of said container and having an edge thereof located over said troughs, means for depositing the solid adhesive on said platform, and a vibrating device connected with said platform for vibrating the same relative to said container and for advancing the adhesive along the platform and for shaking the adhesive over the edge of the platform and into said troughs in uniform quantities and at a continuous uniform rate of speed.

5. In an adhesive applying machine, the combination of a tank for retaining adhesive in fluid form, channel sections under said tank and adapted for circulation of a fluid heating medium for maintaining the adhesive in fluid form, a pre-melting pot adjacent said tank for melting down solid adhesive comprising a container having a bottom wall, a grid in said pre-melting pot disposed in engagement with said bottom wall and having a corrugated cross section, said corrugations setting off a trough structure which at one end is closed and which at their opposite end communicates with said tank, said corrugations also setting off passageways between said troughs closed at their bottoms and which at one end communicate with said tank channel sections and at their opposite ends communicate with compartments connecting adjacent passageways in pairs, a heating medium inlet communicating with one of said compartments, and an outlet communicating with another of said compartments whereby the heating medium entering by way of said inlet is circulated back and forth along a sinuous path of travel successively through said passageways and successively through said channel sections thereby heating the troughs of said pre-melting pot to melt solid adhesive introduced therein and to heat said tank to maintain the melted adhesive in a fluid form.

JOHN H. MURCH.